United States Patent [19]

Hirao et al.

[11] Patent Number: 4,777,065

[45] Date of Patent: Oct. 11, 1988

[54] COMPOSITION FOR SEALING SLIDING CONTACT SECTION

[75] Inventors: Katsumi Hirao, Osaka; Toshio Miyake, Okayama, both of Japan

[73] Assignees: Kanpe Katei Toryoo Kabushiki Kaisha, Osaka; Kabushiki Kaisha Hayashibara Seibutsu Kagaku Kenkyujo, Okayama, both of Japan

[21] Appl. No.: 643,858

[22] Filed: Aug. 24, 1984

[30] Foreign Application Priority Data

Aug. 27, 1983 [JP] Japan ................................ 58-156906

[51] Int. Cl.$^4$ ........................... B05D 7/22; C08L 3/00
[52] U.S. Cl. .................................... 427/239; 106/205; 222/384; 427/384
[58] Field of Search ................ 427/239, 384; 106/162, 106/197.3; 222/384

[56] References Cited

U.S. PATENT DOCUMENTS

| | | | |
|---|---|---|---|
| 3,640,741 | 2/1972 | Etes | 106/189 |
| 3,784,390 | 1/1974 | Hijiya et al. | 106/139 |
| 4,113,501 | 9/1978 | Edamoto | 106/214 |
| 4,306,059 | 12/1981 | Yokobayashi et al. | 264/186 |
| 4,576,645 | 3/1986 | Ravel | 106/128 |
| 4,683,150 | 7/1987 | Hirao | 106/162 |

OTHER PUBLICATIONS

Industrial Gums-Whistler, 1973, pp. 649–656.

*Primary Examiner*—Theodore Morris
*Attorney, Agent, or Firm*—Browdy & Neimark

[57] ABSTRACT

A novel composition comprising one part by weight of a viscosity-imparting agent and 0.1–100 parts by weight of water is disclosed. Usable viscosity-imparting agents are synthetic polymer resins, polyols and hydrophilic organic substances. The viscosity of the composition is, preferably, in the range of 5–20,000 poises. The composition is suitable as sealant for sliding contact sections, e.g. in an aerosol container using a propellant such as liquefied- or compressed gas.

5 Claims, No Drawings

COMPOSITION FOR SEALING SLIDING CONTACT SECTION

FIELD OF THE INVENTION

The present invention relates to a composition to seal a sliding contact section, more particularly, it relates to an aqueous sealing composition to stop a propellant, e.g. compressed or liquefied gas, leaking from the sliding contact section.

BACKGROUND OF THE INVENTION

Generally oil and mechanical seals are used for sealing sliding contact section. It is, however, very difficult to seal a propellant, e.g. compressed or liquefied gas, with the oil or mechanical seal.

For example, in the case of an aerosol container as disclosed in Japan Utility Publication No. 1,474/70, a movable piston means is placed therein to separate the liquefied gas area from the product area. When the piston means slides within the container, the liquefied propellant gas leaks into the product area from the sliding contact section, i.e. from the narrow gap between the piston means and the inside wall of the container. In order to stop such leakage, silicon gum has been used as sealant. The use of silicon gum, however, results in an insufficient seal, and has an additional demerit that the silicon gum per se does not tolerate long use due to rapid deterioration. In order to overcome such disadvantages of the prior art, the present inventors applied for patent a sealing composition for sliding contact section wherein a polyol is used (Japan Patent Kokai No. 213,076/83).

SUMMARY OF THE INVENTION

One object of the present invention is to provide a composition to seal a sliding contact section.

Another object of the present invention is to provide a sealing composition to stop a propellant leaking from the sliding contact section.

Another object of the present invention is to provide a sealing composition which is usable in an aerosol container.

Another object of the present invention is to provide a sealing composition which is usable at a relatively low temperature.

Another object of the present invention is to provide a sealing composition which tolerates a prolonged use.

A further object of the present invention is to provide a non-toxic and harmless sealing composition directed to household uses.

A further object of the present invention is to provide a method to seal a sliding contact section.

These and other objects as may become apparent hereinafter have been attained by an aqueous composition comprising one part by weight of a viscosity-imparting agent and 0.1–100 parts by weight of water.

The wording of "part", as used in the SPECIFICATION, is given in part by weight.

DESCRIPTION OF THE PREFERRED EMBODIMENTS

The viscosity-imparting agents usable in the invention are water-soluble substances which can impart the prescribed viscosity, i.e. 5–20,000 poises, to water: Examples of preferred viscosity-imparting agents are synthetic polymers such as polyethylene oxide, polyethylene glycol, polyvinyl alcohol, polyvinyl pyrrolidone, water-soluble acryl resin, water-soluble polyester resin, water-soluble phenol resin, water-soluble polyamide resin, maleinized oil, maleinized polybutadine, polyvinyl methyl ether, emulsion powder, and emulsion of synthetic resin; polyols such as ethylene glycol, propylene glycol, glycerin, xylitol, sorbitol, maltitol, lactitol, oligosaccharide, mono-saccharide, hydrogenated corn syrup and polyglycerin; natural hydrophilic polymers such as pullulan, elsinan, dextran, levan, mannan, gum arabic, tragacanth gum, guar gum, xanthan gum, carrageenan, pectic substance, hydroxyethyl starch, carboxymethyl cellulose, hydroxyethyl cellulose, casein, and soybean protein; and their derivatives.

Certain inorganic powders such as water glass, aluminium silicate, benton, silica, magnesium silicate, titanium oxide and kaolinite may substitute the above described hydrophilic organic substances, or may be used in combination with the substance, intact or after treatment with an appropriate organic substance.

As regards to the procedure for incorporating a viscosity-imparting agent into water, any suitable procedures may be employed as long as one part of the agent can be incorporated into 0.1–100 parts of water. Preferably, one part of a viscosity-imparting agent is incorporated into 0.1–100 parts of water in a manner such that the viscosity of the resultant composition will fall in the range of 5–20,000 poises when measured at 25° C. by use of BH type viscometer, a product of Tokyo Keiki KK, Tokyo, Japan.

The composition according to the present invention may be incorporated with an appropriate amount of germicidal agent, surface-activating agent, antifoam, pH-regulating agent or emulsion stabilizer.

It was elucidated that the composition so obtained does satisfies the following requirements for a sealing composition to be used to stop the leakage of a propellant such as compressed or liquefied gas at the sliding contact section:

(1) Such composition should have an appropriate viscosity and elasticity.
(2) Such composition should adhere evenly and overall on the sliding contact section to ensure a perfect sealing.
(3) Such composition should have a fluidity sufficient to satisfy the requirement (2) even when the sliding contact section per se is in movement, e.g. as in the case when the piston means is in reciprocal motion.
(4) Such composition should be insoluble in the liquefied propellant gas used.
(5) Such composition should not affect or deteriorate the product content, when it comes into contact with the product content and/or the liquefied gas, as is the case of an aerosol container.
(6) Such composition should satisfy all requirements from (1) through (5) at living temperature, i.e. about 0°–45° C., as well as retaining such properties over a long period up to 0.5 years, preferably, over 2 years.
(7) Desirably, such composition should be non-toxic and harmless because the composition has the possibility of coming into contact with and exposure to human body.

Thus, the composition according to the invention is usable favorably as a sealant to stop a compressed or liquefied gas leaking from the sliding contact section, for example, in an aerosol container wherein a liquefied propellant gas is used, micro compressor, micro pump or in a micro oil hydraulic equipment.

The invention will be understood more readily with reference to the following examples.

EXAMPLE 1

Twenty parts of pullulan, having an average molecular weight of 300,000, was admixed homogenously with 79 parts of water, 0.5 parts of sugar ester, and 0.1 part of "ADEKANATE B-3009A", an antifoam commercialized by Asahi Denka KK, Tokyo, Japan, while stirring and heating to 120° C.

The composition so obtained with a viscosity of about 90 poises was a suitable sealant for sliding contact section in an aerosol container wherein a propellant, particularly, a liquefied propellant gas, was used.

The composition showed neither deterioration nor alteration on six month standing at 45° C.

This Example illustrates a formulation which is neither toxic nor harmful to human or animal. The composition so obtained is a suitable sealant for sliding contact section in aerosol containers wherein a compressed or liquefied gas becomes into contact with the sliding contact section, and wherein various household goods, food products, cosmetics, or drugs are packed.

EXAMPLE 2

Three parts of polyethylene oxide, having an average molecular weight of 350,000 was admixed homogenously with 96.5 parts of water, "NOPCO 8034 L", an antifoam commercialized by San Nopco Ltd., Kyoto, Japan, and 0.1 part of sodium hydroxide while stirring at ambient temperature.

The composition so obtained with a viscosity of about 10,800 poises was a suitable sealant for sliding contact section in an aerosol container which may be used at a high temperature.

EXAMPLE 3

Five parts of hydroxyethyl cellulose, having an average molecular weight of 5,000, was admixed homogenously with 94 parts of water, 0.5 parts of "FS ANTI-FOAM 013B", an antifoam commercialized by Dow Corning Corp., Midland, U.S.A., and 0.5 parts of sodium salt of higher fatty acid while stirring at ambient temperature.

The composition so obtained with a viscosity of about 980 poises was a suitable sealant for sliding contact section, as the one disclosed in Example 1.

EXAMPLE 4

A mixture of 70 parts of "ELOTEX POWDER 50V/907", a powdered emulsion commercialized by Ebnöther AG, Sempach-Station, Switzerland, and 3 parts of polyethylene oxide, having an average molecular weight of 300,000, was dispersed in a system of 26.8 parts of water and 0.2 parts of sodium hydroxide while stirring at ambient temperature.

The dispersion composition so obtained with a viscosity of about 240 poises was a suitable sealant for sliding contact section, as the one disclosed in Example 1.

EXAMPLE 5

A mixture of 20 parts of "ASP #400", an aluminium silicate commercialized by Engelhart Minerals & Chemicals Corporation, N.J., U.S.A., and 20 parts of "JRNC", a titanium oxide commercialized by Teikoku Kako KK, Osaka, Japan, was admixed with 40 parts of 10 w/w % aqueous polyvinyl alcohol solution, polymerization degree of 550, saponification degree of 88.0%, 19 parts of 1 w/v % aqueous polyethylene oxide solution, average molecular weight of about 800,000, 0.7 parts of sodium hexametaphosphate, and 0.3 parts of "NOPCO KF-99", an antifoam commercialized by San Nopco Ltd., Kyoto, Japan.

The dispersion composition so obtained with a viscosity of aboput 209 poises was a suitable sealant for sliding contact section, as the one disclosed in Example 1.

EXAMPLE 6

Two parts of polyethylene oxide, having an average molecular weight of 300,000, and 0.2 parts of potassium hydroxide were mixed and dissolved in 12.8 parts of water. The mixture was admixed with 85 parts of "VINISOL 605", 44 w/w % emulsion of acryl acid ester graft polymer having a moisture content of 56 w/w % and commercialized by Daido Kasei Kogyo KK, Tokyo, Japan, while stirring to obtain a homogenous suspension.

The composition so obtained with a viscosity of about 9.2 poises was a suitable sealant for sliding contact section, as the one disclosed in Example 1.

EXAMPLE 7

Fifty six parts of glycerin was admixed homogenously with 6 parts of pullulan, having an average molecular weight of 200,000, while stirring and heating to 110° C. The admixture was further admixed with 137 parts of "COUPLING SUGAR®", an oligosaccharide mixture having a moisture content of about 25%, commercialized by Hayashibara Co., Ltd., Okayama, Japan, and the resultant was defoamed while stirring and minimizing the moisture loss.

The composition so obtained with a viscosity of about 320 poises was used as a sealant for sliding contact section in different aerosol containers using a propellant, more particularly, a liquefied propellant gas, and the containers were allowed to stand at 45° C. for six months or at −5° C. for one year. No change in the gas-barriering ability of the composition was noted.

This composition was an advantageously usable sealant for sliding contact section in various aerosol containers, as the one disclosed in Example 1.

From the foregoing descriptions, it will be apparent that the present invention provides a practical sealing composition to stop a compressed or liquefied gas leaking from the sliding contact section of an apparatus wherein such gas is used. It will be understood by those skilled in the art that various modifications of the present invention as described in the foregoing Examples may be employed without departing from the scope of the invention.

We claim:

1. A method for sealing a sliding contact section consisting essentially of:
   providing a composition which comprises one part by weight of a viscosity-imparting natural hydrophilic polymer, and 0.1 to 100 parts by weight of water, said composition exhibiting a viscosity of from 5 to 20,000 poises at 25° C.; and
   filling a sliding contact section in an aerosol container with an effective amount of the composition.

2. The method of claim 1, wherein the viscosity of said composition is in the range of 5 to 20,000 poises.

3. The method of claim 1, wherein said natural hydrophilic polymer is one or more members selected from the group consisting of pullulan, elsinan, dextran, levan, mannan, gum arabic, tragacanth gum, guar gum, xanthan gum, carrageenan, pectic substance, hydroxyethyl starch, carboxymethyl cellulose, hydroxyethyl cellulose, casein, and soybean protein.

4. The method of claim 1, wherein said natural hydrophilic polymer is a polysaccharide consisting essentially of repeating maltotriose units, said polymer being selected from the group consisting of pullulan, elsinan, and mixtures thereof.

5. A composition for sealing a sliding contact section in an aerosol container, said composition exhibiting a viscosity of from 5 to 20,000 poises at 25° C., consisting essentially of:

one part by weight of a viscosity-imparting polymer consisting substantially of maltotriose units and selected from the group consisting of pullulan, elsinan, and mixtures thereof; and 0.1 to 100 parts by weight of water.

* * * * *